(12) United States Patent
Howard, Jr. et al.

(10) Patent No.: US 7,238,450 B2
(45) Date of Patent: Jul. 3, 2007

(54) HIGH VOLTAGE LAMINAR CATHODE MATERIALS FOR LITHIUM RECHARGEABLE BATTERIES, AND PROCESS FOR MAKING THE SAME

(75) Inventors: Wilmont Frederick Howard, Jr., Edmond, OK (US); Stephen Wilfred Sheargold, Edmond, OK (US); Anthony Michael Thurston, Edmond, OK (US); Felix Mbanga Towa, Norman, OK (US)

(73) Assignee: Tronox LLC, Oklahoma City, OK (US)

( * ) Notice: Subject to any disclaimer, the term of this patent is extended or adjusted under 35 U.S.C. 154(b) by 624 days.

(21) Appl. No.: 10/743,077

(22) Filed: Dec. 23, 2003

(65) Prior Publication Data

US 2005/0136329 A1  Jun. 23, 2005

(51) Int. Cl.
*H01M 4/58* (2006.01)
*H01M 2/02* (2006.01)
*H01M 8/14* (2006.01)

(52) U.S. Cl. .................. 429/231.95; 429/34; 429/46
(58) Field of Classification Search ............. 429/12, 429/34, 46
See application file for complete search history.

(56) References Cited

U.S. PATENT DOCUMENTS 5,962,166 A    10/1999  Ein-Eli
5,981,106 A    11/1999  Amine
6,214,493 B1    4/2001  Bruce
6,361,756 B1 *  3/2002  Gao et al. .................. 423/599
2002/0114995 A1  8/2002  Thackery
2002/0150530 A1 10/2002  Gao
2003/0082452 A1  5/2003  Atsushi
2003/0087154 A1  5/2003  Ohzuku
2003/0138699 A1  7/2003  Kweon

FOREIGN PATENT DOCUMENTS

| EP | 1 189 296 A2 | 3/2002 |
|---|---|---|
| EP | 1 137 598 B1 | 4/2003 |
| JP | 10-241691 * | 9/1998 |
| WO | 03/015198 A2 | 2/2003 |

OTHER PUBLICATIONS

G. Ceder, D. Carlier, C. Grey, J.P. Gorman, and J. Reed, "The Local Structure and Electrochemical Behavior of Li (Li,Ni,Mn) O2 Compounds", LiBD 2003—Electrode materials, Sep. 14-19, 2003, Abstract No. 53—Oral, Arcachon, France.

Alastair D. Robertson, A. Robert Armstrong and Peter G. Bruce, "Extracting Lithium Beyond Mn4+ in Lithium Manganese Oxide", LiBD 2003—Electrode materials, Sep. 14-19, 2003, Abstract No. 57—Oral, Arcachon, France.

(Continued)

*Primary Examiner*—Dah-Wei Yuan
(74) *Attorney, Agent, or Firm*—William B. Miller

(57) ABSTRACT

Intercalation cathode materials especially suited for use in high-voltage, high-energy lithium rechargeable batteries, having the formulae $Li[Li_{(1-2x)/3}M_yMn_{(2-x)/3}Ni_{(x-y)}]O_2$, where $0<x<0.5$, $0<y\leq0.25$, $x>y$, and M is one or more divalent cations from Ca, Cu, Mg, and Zn. A process for making such materials is also provided.

4 Claims, 1 Drawing Sheet

OTHER PUBLICATIONS

Zhonghua Lu, L. Y. Beaulieu, R. A. Donaberger and J. R. Dahn, "Synthesis, Structure, and Electrochemical Behavior of Li[NixLi 1/3-2x/3Mn2/3-x/3]O2", Journal of The Electrochemical Society 149 (6) A778-A791, 2002, A778-A791, The Electrochemical Society, Inc.

S.-S. Shin, Y.-K. Sun, and K. Amine, "Synthesis and electrochemical properties of Li[Li(1-2x)/3NixMn(2-x)/3]O2 as cathode materials for lithium secondary batteries", Journal of Power Sources 112, 634-638, 2002, Journal of Power Sources, Elsevier Science B.V., www.elsevier.com/locate/jpowsour.

Zhonghua Lu, D. D. Mac Neil, and J. R. Dahn, "Layered Cathode Materials Li[NixLi(1/2-2x/3)Mn(2/3-x/3]O2 for Lithium-Ion Batteries", Electrochemical and Solid State Letters, 4, 2001, A191-A194, The Electrochemical Society, Inc.

J. Molenda, J. Marzec, K. Swierczek, M. Ziemnicki, W. Ojczyk, "The effect of 3d substitutions in the maganese sublattice on the electrical and electrochemical properties of manganese spinel", LiBD 2003—Electrode materials, Sep. 14-19, 2003, Abstract No. 31—Flash oral, Arcachon, France.

Koichi Numata, Chie Sakaki and Shoji Yamanaka, "Synthesis and characterization of layer structured solid solutions in the system of LiCoO2-Li2MnO3", Solid State Ionics 117, 1999, 257-263, Solid State Ionics, Elsevier Science B.V.

Brett Ammundsen, Jens Paulsen, Isobel Davidson, Ru-Shi Liu, Chih-Hung Shen, Jin-Ming Chen, Ling-Yun Jang, and Jyh-Fu Lee, "Local Structure and first Cycle Redox Mechanism of Layered Li1.2Cr0.4O2 Cathode Material", Journal of The Electrochemical Society, 149, 2002, A432-A436, The Electrochemical Society, Inc.

R. V. Chebiam, F. Prado, and A. Manthiram, "Structural Instability of Delithiated Li1-xNi1-yCoyO2 Cathodes", Journal of The Electrochemical Society, 148, 2001, A49-A53, The Electrochemical Society, Inc.

J.-S. Kim, J. T. Vaughey, C. S. Johnson, and M. M. Thackeray, "Significance of the Tetrahedral A Site on the Electrochemical Performance of substituted Li1.05M0.05Mn1.90O4 Spinel Electrodes (M = Li, Mg, Zn, Al) in Lithium Cells", Journal of The Electrochemical Society, 150, 2003, The Electrochemical Society, Inc.

Youngjoon Shin and Arumugam Manthiram, "Origin of the Capacity of Spinel LiMn2-yLiyO4 ±δ(0≦y≦0.15) in the 5 V Region", Electroheical and Solid-State Letters, 6 (12), 2003, A249-A251, The Electrochemical Society, Inc.

C. Storey, I. Kargina, Y. Grincourt, I. J. Davidson, Y.C. Yoo, D. Y. Seung, "Electrochemical characterization of a new high capacity cathode", Journal of Power Sources 97-98, 2001, 541-544, Elsevier Science B.V., www.elsevier.com/locate/jpowsour.

* cited by examiner

HIGH VOLTAGE LAMINAR CATHODE MATERIALS FOR LITHIUM RECHARGEABLE BATTERIES, AND PROCESS FOR MAKING THE SAME

FIELD OF THE INVENTION

The present invention relates to intercalation cathode materials suitable for use in rechargeable lithium batteries. More particularly, the invention relates to layered (or laminar) lithium manganese nickel oxide cathode materials for such batteries.

BACKGROUND

Lithium ion batteries are of great technological interest for application in a variety of contexts, ranging from cell phones, laptop computers, and electric vehicles, to use in energy backup systems. Their broadest usage at present is in portable electronic devices.

Lithium ion batteries consist of two lithium intercalation electrodes (an anode and a cathode) and an ionically-conducting electrolyte. A suitable cathode material should have a high potential versus lithium, reversibly insert lithium ions without losing structural integrity, and not induce reactions with the electrolyte. Candidate materials for lithium ion battery cathodes are typically lithiated transition metal oxides. The most commercially used cathode materials are described by the formulae $LiCoO_2$ and $LiCo_xNi_{1-x}O_2 (x<0.3)$, and deliver moderate capacity and good cyclability. However, the cost and safety concerns (notably, the tendency toward instability at low lithium contents) associated with these compounds make them less than ideal. Thus, much research has taken place to find alternatives to $LiCo_xNi_{1-x}O_2$ cathode materials.

One widely studied species is $LiMn_2O_4$ and its derivatives, also known as spinel. Unfortunately, these materials experience $Mn^{2+}$ dissolution into the electrolyte, producing rapid capacity loss on cycling or storage above room temperature. Substitution of a portion of the Mn by other elements (Li, Mg, Zn, or Al, for example) creates compositions with greater stability, but the initial reversible capacity is reduced substantially.

Another alternative which has been suggested, and which possesses the same layered structure as $LiCo_xNi_{1-x}O_2$, is $LiMnO_2$ and its derivatives, in which the Mn is partially replaced with a stabilizing cation. U.S. Pat. No. 6,214,493 to Bruce et al. discloses in this regard that laminar $Li_yMnO_2$, a material inherently unstable when delithiated, is much less susceptible to structural degradation when another metal replaces a minority portion of the Mn. The stabilizing element may be any metal, but is most typically a transition metal in its +3 oxidation state, including Co, Al, and Fe. A further refinement taught by Bruce is the addition of 'excess' lithium (i.e., y>1) to strengthen the lattice.

Patent Cooperation Treaty Application No. PCT/US02/24684, published as WO 03/015198A2 (Dahn et al), describes materials with the formula $Li_y[M_{1-b}Mn_b]O_2$, where $0 \leq y<1, 0<b<1$ and M is Ni, Co or Fe, and wherein the layered O3 crystal structure is maintained (identical to $Li[Li_{1/3}Mn_{2/3}]O_2$). Materials are described as attaining a capacity of 130 mAh/g when charged t 4.3V, similar to spinel and $LiCo_xNi_{1-x}O_2$, while charging above 4.5V leads to capacities exceeding 225 mAh/g.

$Li_2MnO_3$ ($Li[L_{1/3}Mn_{2/3}]O_2$) and its structural derivatives have also been investigated. Thus, Numata et al. in *Solid State Ionics*, no. 117, pp. 257-263 (1997) describe a stable, battery-active solid solution of $LiCoO_2$ and $Li_2MnO_3$ having the layered structure of the Co compound. Still other references describe layered lithium manganese nickel oxide cathode materials derived from $Li_2MnO_3$ and which have the formulae $Li[Li_{(1-2x)/3}Mn_{(2-)/3}Ni_x]O_2$, see, for example, Lu et al., *Electrochemical and Solid State Letters*, vol. 4, no. 11, pp A191-A1094 (2001), Lu et al., *Journal of the Electrochemical Society*, vol. 149, no. 6 pp A778-A791 (2002), and Shin et al., *Journal of Power Sources* 112, pp 634-638 (2002).

More recently, EP 1 189 296A2 relates the finding by Paulsen et al. that replacing a fraction of the $Ni^{2+}$ with $Co^{3+}$ produces intercalation compounds with greater rate capability than the parent LMN family or $LiMO_2$ end members. Both the MnNi and CoMnNi series have significant capacities above 4.2V, but this is a voltage region incompatible with organic electrolyte solvents (including polymers). At such elevated potentials, current flow is forced by electrochemically decomposing solvent molecules into ionic species, most notably producing protons, which may dissolve some of the transition metal out of the cathode. The dissolved species and molecular fragments from the electrolyte subsequently accumulate on the electrodes (typically the anode) and interfere with lithium ion transport, reducing cell capacity.

SUMMARY OF THE PRESENT INVENTION

Figure 1:
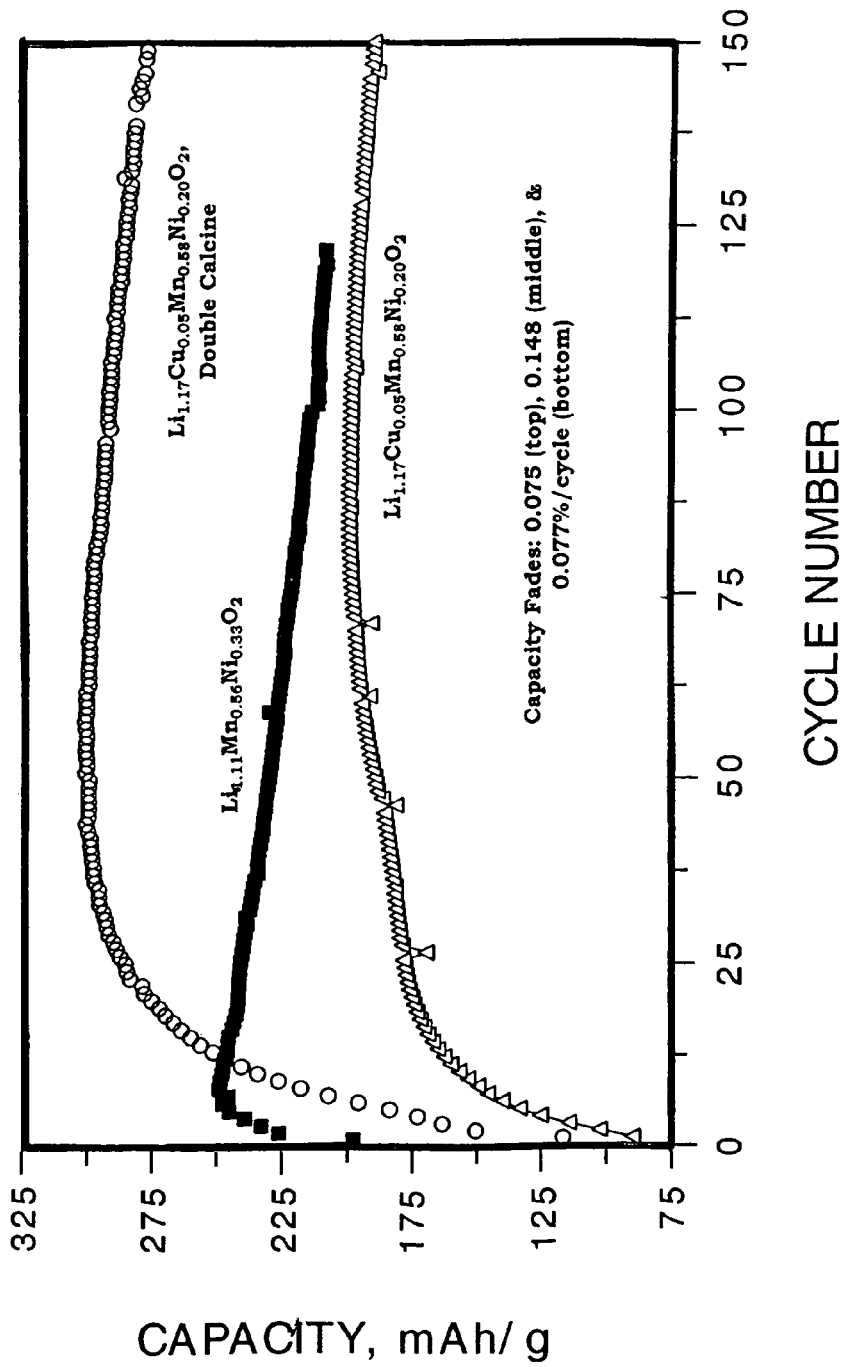
FIG. 1 graphically depicts the discharge capacity profiles of a prior art layered lithium manganese nickel oxide cathode material and two modified layered lithium manganese nickel oxide cathode materials according to the present invention, whose respective syntheses are described below in Comparative Example 3 and Examples 1 and 5.

The current invention is based upon the discovery that doping selected additional metal element(s) into materials with the general formulation $Li[Li_{(1-2x)/3}Mn_{(2-)/3}Ni_x]O_2$ (derived from $Li_2MnO_3$) will improve upon the electrochemical performance of these materials.

For example, FIG. 1 provides a summary of the benefits obtained with Cu doping according to the present invention, producing a material according to the general formula $Li[Li_{(1-2x)/3}Cu_yMn_{(2-)/3}Ni_{x-y}]O_2$. As more fully described in the illustrative examples below (more particularly referring to Comparative Example 3), the baseline compound, $Li_{1.11}Mn_{0.56}Ni_{0.33}O_2$, was prepared according to the teachings of the Lu et al. references above. When a related Cu-doped material ($Li_{1.17}Cu_{0.05}Mn_{0.58}Ni_{0.20}O_2$, Example 1) was similarly prepared in keeping with the present invention, the maximum capacity dropped 20 percent from that observed with the baseline compound, but capacity fade was halved (that is, useful operating life doubled). Preparing the same copper-doped layered manganese nickel oxide formulation with two calcining steps (Example 5), however, increased the capacity to 20 percent greater than was observed with the baseline compound, and left the fade improvement intact. We determined that a second heating of the baseline LMN material prepared according to the prior art methods yielded little change in capacity/fade results. Also, a single 1000° C. reaction of the Cu-doped species led to capacity/cycle number curves equivalent to the double calcine plot in FIG. 1.

The present invention thus in one aspect provides useful cathode materials of the formula $Li[Li_{(1-2x)/3}M_yMn_{(2-)/3}$ $Ni_{x-y}]O_2$, where 0<x0.5, 0<y≦0.25, x>y, and M is one or more of the divalent cations of Ca, Cu, Mg, and Zn. The stabilizing cations $M^{2+}$ (with the exception of $Cu^{2+}$) have an oxidation potential greater than 5V in the operating battery, to insure that $M^{2+}$ does not participate in the cathode oxidation during charge. Increasing M's oxidation state could distort or destroy the preferred crystal structure, reducing the material's ability to intercalate $Li^+$. $Cu^{2+}$ oxidizes to $Cu^{3+}$ above 4.5V, thus allowing electron flow through the cathode, rather than oxidizing the electrolyte to provide ions that will support electronic conductivity.

The present invention in a second, related aspect provides a method for making improved layered lithium manganese nickel oxide cathode materials incorporating one or more of the divalent cations of Ca, Cu, Mg and Zn, comprising forming an intimate mixture of the precursor salts, oxides or both of lithium, manganese, nickel and the incorporated element or elements, then subjecting the mixture one or more times to a temperature of about 950° C. or greater or at least two times to a temperature of less than 950° C.

DETAILED DESCRIPTION OF PREFERRED EMBODIMENTS OF THE INVENTION

As background for the development of the modified layered lithium manganese nickel oxide cathode materials of the present invention, layered lithium manganese nickel oxides (LMNs) are in general more stable to dissolution than $LiMn_2O_4$ and its derivatives, but even a small amount of dissolved Mn reporting to the anode will significantly reduce the capacity of a cell in which the material is employed. This interference may arise from two mechanisms: $Mn^{2+}$ insertion into the anode, thus blocking $Li^+$ access, and precipitation of $Mn^{2+}$ salts in the solid-electrolyte interphase, which restricts $Li^+$ transport to and from the anode. $Mn^{2+}$ is produced by the disproportionation reaction

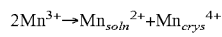

$2Mn^{3+} \rightarrow Mn_{soln}^{2+} + Mn_{crys}^{4+}$ which is catalyzed by trace acids (especially common in commercial liquid electrolytes containing $LiPF_6$). Therefore, minimizing the presence of $Mn^{3+}$ is a primary objective.

It is well known in the art that solid state reactions are difficult to drive to completion due to imperfect mixing of the reactants. In the synthesis of previously described LMN compounds, an aqueous solution step is required: the metal ions are insufficiently mobile, even above the 800° C. minimum reaction temperature, to achieve complete mixing at the atomic level. Further, $Li_2O$ (from thermally decomposed Li salts) is a flux, promoting the movement of cations in the hot reaction mixture. Thus, higher Li:metal ratios facilitate the random distribution of cations throughout the product. The result of such chemie douce preparations is a homogeneous compound without the Mn- or Ni-rich domains that lead to the formation of $Ni^{3+}$ and $Mn^{3+}$.

At first glance, the existence of $Ni^{3+}$ and $Mn^{3+}$ in the subject LMN compositions appears likely: both $LiNi^{3+}O_2$ and $LiMn^{3+}Mn^{4+}O_4$ are stable compounds. The oxidation potential of $Ni^{3+}$ is greater than that of $Mn^{4+}$, however, and at or above an 800° C. reaction temperature, the equilibrium

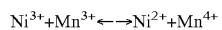

$Ni^{3+} + Mn^{3+} \leftarrow \rightarrow Ni^{2+} + Mn^{4+}$ lies far to the right. Consequently, complete atomic mixing of cations yields products with no detectable $Mn^{3+}$.

Even with the previously-described procedure, the loss of capacity during battery operation (fade) is problematic for the known $Li[Li_{(1-2x)/3}Mn_{(2-)/3}Ni_x]O_2$ species. It is still possible, for example, to leach Mn out of the cathode material from transient $Mn^{3+}$ formed during the cathode's redox operation. Further, rearrangement or distortion of the cathode material's crystal lattice will constrict intercalation channels and diminish the insertion of Li ions (discharge). Another problem in Li-ion batteries, especially when operated above 4V, is the electrochemical degradation of the electrolyte solvent (liquid or polymer). As the cathode is charged (delithiated), conductivity decreases, until the path of least resistance involves solvent breakdown, producing charged organic fragments (including protons). Trace acid thus produced can attack the cathode material, and anionic species will migrate to the anode and form an ionically-resistive coating. Either occurrence will diminish cell performance.

Such actions can be mitigated in accordance with the teachings of the present invention, by the introduction of one or more stabilizing admetals (M) to form the series $Li[Li_{(1-2x)/3}M_yMn_{(2-x)/3}Ni_{(x-y)}]O_2$. Preferred admetals are divalent cations that will not participate in the redox cycles normal to battery operation. That is, admetal oxidation and reduction potentials will lie outside the cathode voltage range, and the stabilizing cations will maintain a fixed charge. With no change in oxidation state, the admetals will maintain a constant ionic radius and act as pillars in $Li[Li_{(1-2x)/3}M_yMn_{(2-x)/3}Ni_{(x-y)}]O_2$ to prevent structural degradation. The exception is Cu, but $Cu^{+2}$ and $Cu^{+3}$ have very similar ionic radii. The selected admetals preferably have ionic radii in the range of 0.50-0.70 nm to avoid structural distortion of the LMN crystalline lattice during cycling (see Table 1).

TABLE 1

Ionic Radii of Critical Elements

| Element | Ionic Charge | Radius, nm |
|---|---|---|
| Ca | +2 | 1.00 |
| Cu | +2 | 0.57 |
| Cu | +3 | 0.54 |
| Mg | +2 | 0.57 |
| Mn | +3 | 0.645 |
| Mn | +4 | 0.53 |
| Ni | +2 | 0.69 |
| Ni | +3 | 0.58 |
| Ni | +4 | 0.48 |
| Zn | +2 | 0.60 |

The modified LMNs of the present invention are those characterized by the general formulation above, in which 0<x<0.5, 0<y≦0.25, x>y, and M is one or more of the divalent cations of Ca, Cu, Mg, or Zn. More preferably, 0.1≦x≦0.4, 0<y≦0.15, and x>y. Most preferred enhanced LMNs according to the present invention comprise a Cu modifier with 0.15≦x≦0.35 and 0.02≦y≦0.1.

There are three general methods of preparing the laminar cathode materials of this invention: solid state, solution/gel, and melt. In the first instance, the ingredients are any oxides or salts that will thermally decompose into an oxide below about 1100° C. in the presence of the other starting materials. Such salts include, but are not limited to, carbonates, hydroxides, nitrates, carboxylates, oxalates, and species bound to a chelating agent. The key feature of solid-state preparations is ease of processing: typically, the ingredients are blended or milled together to bring about an intimate mix of the reactant particles. This mix is then calcined at 800-

1100° C. for several hours. To promote a phase-pure product,.the mixed-metal oxide may be re-milled or ground to reduce particle size and again heated to 800-1100° C.

More preferred are solution or gel-type preparations that require the starting materials to be soluble in an appropriate solvent, such as water or alcohol. These salts are typically nitrates or carboxylates, and dissolution ensures that the elements are mixed at the molecular level. If all of the salts are in a single solution, the solvent is evaporated and the remaining solid materials reacted at 800-1100° C. If not all the reactants will dissolve, a gelling agent such as $NH_4OH$, organic amine, or coordinating polymer, may be added to the solution, to avoid segregation during drying. The resulting slurry may be filtered (if all the metals are bound in the precipitate) or dried to remove the solvent. The dried salts or gels typically undergo a preliminary heating step at 250-500° C. that leaves mostly amorphous oxides with traces of the gelling agent and salt residue. Finally, the remaining solids are reacted at 800-1100° C. For reactions below approximately 950° C., an intermediate milling and second calcining step are generally necessary to achieve single-phase product.

The melt process is most preferred. This involves low-melting salts, such as nitrates or carboxylates, which are blended or ball-milled together and heated to 200-500° C. The molten state of the reactants at these temperatures promotes an intimate mixing of the ingredients equivalent to that found in solutions. The kiln temperature is then raised to complete the reaction at 800-1100° C. Again, a second calcining step is generally unnecessary if the reaction temperature is greater than about 950° C.

It is understood by those skilled in the art that the final product produced according to the above methods should preferably be ground or milled to yield a smaller particle size. A median size below 10 μm is desirable, and below 3 μm even more desirable, for optimum performance of the cathode material during battery operation. The small fraction of oversized particles normal to this operation is typically removed by air classification.

Further, those skilled in the art recognize that the reaction of well-mixed Li, Mn, Ni, and other (admetal M) salts will also lead to the cathode material of desired purity. The preparation methods described above yield phase-pure (by x-ray diffraction) products, but the scope of this invention is not limited to these particular methods. A reaction temperature of 900° C. will yield single-phase LMN species, but the most preferred reaction temperature of 1000° C. produces a highly crystalline product with lower capacity fade.

Admetals M such as Mg r Zn with a single oxidation state (and therefore, fixed ionic radius) in the inventive $Li[Li_{(1-2x)/3}M_yMn_{(2-x)/3}Ni_{(x-y)}]O_2$ compounds yield crystal lattices resistant to structural degradation during $Li^+$ extraction or insertion. Other admetals, such as Ca or Cu, with larger or variable radii, respectively, enhance capacity by enlarging the intercalation channels or increasing ionic conductivity: these materials offer access to 4.2-5V potentials without degrading the electrolyte solvent or polymer. The LMNs of the present invention are those characterized by the general formulation above, in which $0<x<0.5$, $0<y\leq0.25$, $x>y$, and M is one of or any combination of Ca, Cu, Mg, and Zn. Preferably, $0.1\leq x\leq0.4$, $0<y\leq0.15$, and $x>y$. Most preferred LMNs according to the present invention comprise a $Cu^{+2}$ stabilizer with $0.15\leq x\leq0.35$ and $0.02\leq y\leq0.1$. The most preferred formulations have capacities exceeding 300 mAh/g and produce a calculated available energy of about 1.3 Wh/g. Batteries incorporating such intercalating cathode materials are characterized by relatively low capacity fade and unusually high energy output, operating in the range 2.5-4.6V or higher and $\geq35°$ C.

Modified LMNs according to the present invention are useful for the full range of lithium rechargeable batteries, such batteries generally comprising (exclusive of the container and portions that carry or monitor the electronic charge) a cathode, electrolyte, separator and anode, where in some instances the electrolyte and separator are one and the same.

The cathode comprises a stabilized LMN material as described herein for reversibly intercalating Li ions, and will typically further comprise one or more conductive aids, typically carbon black, graphite, r both carbon black and graphite together with Li salt(s), and will employ a polymeric binder to insure dimensional integrity. Finely powdered ceramic metal oxides may be incorporated into the cathode to enhance conductivity, scavenge trace moisture, or facilitate processing. Binders and Li salts are preferably chosen from those species that are stable at operating voltages above 4.5V. Cathode compositions using the modified LMNs of the present invention will generally preferably include from about 75 to about 95 percent by weight of the modified LMN material, from about 3 to about 10 weight percent of binder, and about 2 to about 15 percent of conductive aid(s).

The electrolyte facilitates the transfer of Li ions between the electrodes, and comprises a solvent or polymer, or mix of solvents and/or polymers, with one or more ionic conductivity aids. The solvent must be stable over the battery's operating range (0.0-5.0V versus Li), and is selected from polar organic liquids, polymers, or room temperature molten salts (also known as ionic liquids). One or more Li salts, typically the same as mixed into the cathode, are added as ionic conductivity aids. Ceramic metal oxides may also be present to enhance conductivity, scavenge moisture, or facilitate processing, as in the cathode, and materials may be added to neutralize trace acids. Electrolyte compositions can vary widely, from about 25 weight percent of solvent and 75 percent of conductivity aids to 95 percent of solvent and 5 percent of conductivity aids.

Separators are used to segregate the electrodes, thus preventing short circuits. A commercial example is Celgard®, an inert, microporous polymer that is wet by the electrolyte solution, thus permitting Li ion transfer between the electrodes. It is understood that dimensionally stable electrolytes, termed polymer or gel electrolytes, as described above, may also function as separators so that the electrolyte and separator are in this case one and the same.

Anodes may comprise lithium metal or alloys of lithium, or a mix of intercalating material and polymeric binder that reversibly accept Li ions. This latter anode material is typically partially or completely graphitized carbon, and the binder is chosen for its stability against reduction at low voltage. Another class of anode materials suitable for this application are metal oxides, carbides, nitrides, or phosphides which may or may not contain lithium, and are capable of reversibly inserting lithium ions at low voltages (<1.5V) relative to Li metal.

The present invention may be more fully understood by reference to the following examples of laminar lithium manganese nickel oxide cathode materials prepared both with and without the stabilizing admetals that characterize the present invention in a first aspect and according to various methods.

ILLUSTRATIVE EXAMPLES

Comparative Example 1

$Li_{1.06}Mn_{0.53}Ni_{0.42}O_2$

A solution consisting of 66.24 g $Mn(NO_3)_2.4H_2O$ (Fluka Chemie AG), 60.58 g $Ni(NO_3)_2.6H_2O$ (Fluka Chemie AG), and 200 ml de-ionized water was prepared and stirred until all of the metal nitrates were dissolved. The solution was dripped into a continuously stirred LiOH solution containing a stoichiometric excess of base to insure complete precipitation f the metal hydroxides. The resulting precipitate was filtered, washed with de-ionized water, and dried at 180° C. To 40.13 g of dry metal hydroxide solids, 20.76 g $LiOH.H_2O$ (FMC Lithium) was added, and the solids were intimately mixed in a blender. The mixture was decomposed to the oxides through heating at 480° C. for 3 hours and then was allowed to cool rapidly outside the furnace. The solids were then ball-milled, calcined at 900° C. for 5 hours, and again cooled rapidly to ambient temperature, yielding $Li_{1.06}Mn_{0.53}Ni_{0.42}O_2$.

Comparative Example 2

$Li_{1.06}Mn_{0.53}Ni_{0.42}O_2$

A solution consisting of 7207.2 g $Mn(NO_3)_2.4H_2O$ (Alfa Aesar), 6500.0 g $Ni(NO_3)_2.6H_2O$ (Alfa Aesar) and 10 L de-ionized water was prepared as in Comparative Example 1. The metal nitrate solution was added at 15 ml/min to a continuously stirred LiOH solution, also as in Example 1. The resulting precipitate and solution was decanted, slurried with fresh de-ionized water, filtered, washed with de-ionized water, and dried at 180° C. 4472.0 g of the dry metal hydroxides were Retsch milled with 2311.9 g $LiOH.H_2O$ (FMC Lithium). The mixture was reacted as in Comparative Example 1. The product, $Li_{1.06}Mn_{0.53}Ni_{0.42}O_2$, was jet milled and classified to remove coarse particles.

Comparative Example 3

$Li_{1.11}Mn_{0.56}Ni_{0.33}O_2$

According to the procedure of Comparative Example 1, a solution consisting of 140.53 g $Mn(NO_3)_2.4H_2O$ (Alfa Aesar), 96.84 g $Ni(NO_3)_2.6H_2O$ (Alfa Aesar), and 450 ml de-ionized water yielded 77.3 g of dry metal hydroxide powder. This powder was Retsch milled with 44.90 g $LiOH.H_2O$. The mix was reacted as in Comparative Example 1, producing $Li_{1.11}Mn_{0.566}Ni_{0.33}O_2$.

Comparative Example 4

$Li_{1.20}Mn_{0.60}Ni_{0.20}O_2$

A solution consisting of 124.92 g $CH_3CO_2Li.2H_2O$ (Aldrich), 50.27 g $(CH_3CO_2)_2Ni.4H_2O$ (Aldrich), 148.54 g $(CH_3CO_2)_2Mn.4H_2O$ (Aldrich), and 1500 ml de-ionized $H_2O$ was prepared as in Comparative Example 1. This metal acetate solution was dripped into a continuously-stirred 2M glycolic acid (Aldrich, tech grade) solution. The pH of the mixture was adjusted to 7.0 by the addition of $NH_4OH$ (Mallinckrodt). Solvent was removed by evaporation, until a gel formed. This gel decomposed at 480° C. for 3 hours to remove the organics and reacted at 900° C. for 5 hours, producing $Li_{1.20}Mn_{0.60}Ni_{0.20}O_2$.

Comparative Example 5

$Li_{1.11}Mn_{0.56}Ni_{0.33}O_2$

A solution consisting of 140.53 g $Mn(NO_3)_2.4H_2O$ (Alfa Aesar), 96.84 g $Ni(NO_3)_2.6H_2O$ (Alfa Aesar), and 400 ml $CH_3OH$ (Aldrich) was combined with 41.00 g $Li_2CO_3$ (FMC Lithium) dissolved in 500 ml glacial $CH_3CO_2H$ (Baker). The resulting solution was dried in a rotary evaporator to produce a gel, then reacted, according to the method of Comparative Example 1, producing $Li_{1.11}Mn_{0.56}Ni_{0.33}O_2$.

Example 1

$Li_{1.17}Cu_{0.05}Mn_{0.58}Ni_{0.20}O_2$

According to the procedure of Comparative Example 1, a solution consisting of 12.08 g $Cu(NO_3)_2.3H_2O$ (Alfa Aesar), 147.35 g $Mn(NO_3)_2.4H_2O$ (Alfa Aesar), 58.16 g $Ni(NO_3)_2.6H_2O$ (Alfa Aesar), and 475 ml de-ionized water yielded 69.6 g of dry metal hydroxide. This powder was blended with 45.23 g $LiOH.H_2O$ (FMC Lithium). The mix was reacted according to Comparative Example 1, producing $Li_{1.17}Cu_{0.05}Mn_{0.58}Ni_{0.20}O_2$.

Example 2

$Li_{1.06}Cu_{0.17}Mn_{0.53}Ni_{0.25}O_2$

According to the procedure of Comparative Example 1, a solution consisting of 40.35 g $Cu(NO_3)_2.3H_2O$ (Alfa Aesar), 133.45 g $Mn(NO_3)_2.4H_2O$ (Alfa Aesar), 72.70 g $Ni(NO_3)_2.6H_2O$ (Alfa Aesar), and 500 ml de-ionized water yielded 81.9 g of dry metal hydroxide. This powder was Retsch milled with 42.0 g $LiOH.H_2O$ (FMC Lithium) and the mix was reacted according to Comparative Example 1, forming $Li_{1.06}Cu_{0.17}Mn_{0.53}Ni_{0.25}O_2$.

Examples 3a, 3b, 3c $Li_{1.253}Cu_{0.020}Mn_{0.627}Ni_{0.100}O_2$ 337.9 g $Li_2CO_3$ (FMC Lithium) were slurried in 1.0 L deionized $H_2O$ and dissolved with 550.3 g glacial $CH_3COOH$ (EM Science). An additional 5.0 L deionized $H_2O$ was added to the acetate solution, plus 29.5 g $(CH_3CO_2)_2Cu.H_2O$ (Alfa Aesar), 1,121.4 g $(CH_3CO_2)_2Mn.4H_2O$ (Shepard Chemical), and 182.7 g $(CH_3CO_2)_2Ni.4H_2O$ (Shepard Chemical). After stirring until the salts dissolved, the solution was filtered and spray dried using a Niro Mobil Minor rotary atomizer with an inlet temperature of 380° C. and an outlet temperature of 111° C. The spray dried salts were decomposed to oxides through heating at 375° C. for 3 hours, then the oxides were Retsch milled for homogeneity and divided into three fractions. These three powder fractions were in turn calcined at 900, 1000 or 1100° C. for 5 hours with a slow cooldown, producing $Li_{1.253}Cu_{0.020}Mn_{0.627}Ni_{0.100}O_2$ (Examples 3a, 3b, and 3c, respectively).

Example 4

$Li_{1.17}Mn_{0.58}Ni_{0.20}Zn_{0.05}O_2$

Following the procedure of Comparative Example 1, a solution consisting of 14.87 g $Zn(NO_3)_2.6H_2O$ (Alfa Aesar), 147.35 g $Mn(NO_3)_2.4H_2O$ (Alfa Aesar) $Ni(NO_3)_2.6H_2O$ (Alfa Aesar), and 425 ml de-ionized water yielded 70.7 g of dry metal hydroxide. This powder was blended with 44.1 g $LiOH.H_2O$ (FMC Lithium). The mix was reacted, producing $Li_{1.17}Mn_{0.58}Ni_{0.20}Zn_{0.05}O_2$.

Example 5

$Li_{1.17}Cu_{0.05}Mn_{0.58}Ni_{0.20}O_2$

A solution consisting of 6.04 g $Cu(NO_3)_2.3H_2O$ (Alfa Aesar), 73.68 g $Mn(NO_3)_2.4H_2O$ (Alfa Aesar), 29.1 g $Ni(NO_3)_2.6H_2O$ (Alfa Aesar), and 475 ml de-ionized water was prepared according to the procedure of Comparative Example 1. A 4M LiOH solution and the metal nitrate solution were dripped simultaneously into a continuously stirred beaker initially containing 150 ml deionized water. The resulting slurry was maintained at pH 10 by regulating the flow of reactants. The hydroxide precipitate was processed according to Comparative Example 1. 37.1 g of dry metal hydroxides were blended with 24.13 g $LiOH.H_2O$ (FMC Lithium) and reacted by heating to 900° C. for 5 hours, grinding in a mortar and pestle, and re-heating to 900° C. for 5 hours, producing $Li_{1.17}Cu_{0.05}Mn_{0.58}Ni_{0.20}O_2$.

Example 6

$Li_{1.25}Ca_{0.025}Mn_{0.625}Ni_{0.10}O_2$

An aqueous solution containing 156.9 g $Mn(NO_3)_2.4H_2O$ (Alfa Aesar), 29.6 g $Ni(NO_3)_2.6H_2O$ (Alfa Aesar) and 5.96 g $Ca(NO_3)_2.H_2O$ (Alfa Aesar) was added dropwise to a stirred 4M LiOH solution (75.5 g $LiOH.H_2O$ (20% excess, FMC Lithium) in 450 ml deionized $H_2O$) to obtain a tan slurry. The solid was recovered by filtration, washed twice with deionized $H_2O$ and dried at 180° C. overnight (yield 62.7 g). To this solid was added 49.8 g $LiOH.H_2O$ (FMC Lithium) and the mixture Retsch milled before heating to 480° C. for 3 hours. The mixture was reground, reacted at 900° C. for 10 hours, and quenched to room temperature, producing $L_{1.25}Ca_{0.02}Mn_{0.625}Ni_{0.10}O_2$.

Example 7

$Li_{1.267}Cu_{0.025}Mn_{0.633}Ni_{0.075}O_2$ 190.5 g $(CH_3CO_2)_2Mn.4H_2O$ (Shepard Chemical), 23.1 g $(CH_3CO_2)_2Ni.4H_2O$ (Shepard Chemical), 6.19 g $(CH_3CO_2)_2 Cu.H_2O$ (Alfa Aesar) and 57.5 g $Li_2CO_3$ (FMC Lithium) were ground together in a mortar and pestle. The mixture was dried at 80° C. for one hour, followed by slow heating (0.6° C./minute) to 360° C. to decompose the organics. The product, a multi-colored powder, was Retsch milled and heated at 900° C. for 5 hours before slowly cooling to ambient temperature, producing $Li_{1.267}Cu_{0.025}Mn_{0.633}Ni_{0.075}O_2$.

Example 8

$Li_{1.3}Mg_{0.025}Mn_{0.65}Ni_{0.025}O_2$

An aqueous solution containing 155.3 g $Mn(NO_3)_2.4H_2O$ (Alfa Aesar), 6.9 g $Ni(NO_3)_2.6H_2O$ (Alfa Aesar) and 6.1 g $Mg(NO_3)_2.H_2O$ (Alfa Aesar) was dripped into a stirred 4M LiOH solution (67.1 g $LiOH.H_2O$ (20% excess, FMC Lithium) in 500 ml $H_2O$) to obtain a tan slurry. The solids were filtered, washed twice with deionized $H_2O$, and dried at 180° C. overnight. To this solid was added 45.5 g $LiOH.H_2O$ (FMC Lithium), and the mixture was Retsch milled before heating to 480° C. for 3 hours to decompose the hydroxides. The mixture was ground with a mortar and pestle, reacted at 900° C. for 5 hours and slow cooled to room temperature, yielding $Li_{1.3}Mg_{0.025}Mn_{0.65}Ni_{0.025}O_2$.

The following table shows the maximum capacity and long-term fade of the cathode materials whose preparations are described in the preceding examples. Coin cells were constructed for this testing with Li foil anodes, with an electrolyte comprised of 1M $LiPF_6$ dissolved in a mixture of equal parts by weight of ethylene carbonate and dimethylcarbonate, and with cathode discs containing 30 percent by weight of carbon black as a conductivity aid, 5 percent by weight of polyvinylidene fluoride (PVDF) as a binder, and 65 percent by weight of the particular cathode active material. These coin cells were all cycled at C/7 rate at 55° C. over 2.5-4.6V.

TABLE 2

Electrochemical Performance of $Li[Li_{(1-2x)/3}M_yMn_{(2-x)/3}Ni_{(x-y)}]O_2$ Cathode Materials

| Example Number | Maximum Capacity, mAh/g | Cycle Number of Capacity Maximum | Fade after Capacity Maximum, %/cycle |
|---|---|---|---|
| Comp 1 | 236 | 4 | 0.233 |
| Comp 2 | 270.5 | 1 | 0.621 |
| Comp 3 | 244 | 1 | 0.806 |
| Comp 4 | 267 | 5 | Failed @ cycle 5 |
| Comp 5 | 253 | 8 | 0.153 |
| 1 | 232 | 22 | 0.327 |
| 2 | 209.5 | 37 | 0.354 |
| 3a | 261.1 | 24 | 0.083 |
| 3b | 272.2 | 40 | 0.066 |
| 3c | 250 | 21 | 0.173 |
| 4 | 224.7 | 26 | 0.160 |
| 5 | 310.5 | 47 | 0.111 |
| 6 | 339 | 5 | 0.667, failed @ cycle 16 |
| 7 | 308 | 20 | 0.269 |
| 8 | 176 | 60 | 0.042 |

In keeping with the results shown in Table 2, cathode active materials according to the present invention will preferably be characterized as providing 160 mAh/g capacity with a fade <0.05%/cycle at ≧30° C. over the range 2.5-4.6V (Example 8). More preferred materials will exceed 250 mAh/g with <0.1%/cycle fade at ≧35° C. (Examples 3a and 3b), while the most preferred modified LMNs according to the present invention will produce >300mAh/g with <0.125%/cycle fade at ≧40° C. (Example 5), all within a 2.5-4.6V charge-discharge range. For those applications requiring maximum capacity over a short operating life, Example 6 would be preferred.

We claim:

1. An intercalation cathode material having the formula $Li[Li_{(1-2x)/3}M_yMn_{(2-x)/3}Ni_{(x-y)}]O_2$, where 0.1<x<0.4 and 0<y<0.15, x>y, and M is one or more divalent cations selected from Ca, Cu, Mg and Zn.

2. A cathode material according to claim 1, wherein M is copper, 0.15≦x≦0.35, and 0.02≦y≦0.1.

3. A method for making an improved layered lithium manganese nickel oxide cathode material of the formula $Li[Li_{(1-2x)/3}M_yMn_{(2-x)/3}Ni_{(x-y)}]O_2$, where 0.1<x<0.4 and 0<y<0.15, x>y. and M is one or more divalent cations selected from Ca, Cu. Mg and Zn, comprising forming an intimate mixture in the correct proportions of the precursor salts, oxides or both of lithium, manganese, nickel and one or more of the divalent cations of Ca, Cu. Mg and Zn, then subjecting the mixture one or more times to a temperature of about 950° C. or greater or at least two times to a temperature of less than 950° C., whereby a phase-pure layered lithium manganese nickel oxide is formed including the incorporated element or elements.

4. A method according to claim 3, wherein the mixture of precursor salts or oxides is reacted in one heating step at a temperature between 950° C. and 1050° C.

* * * * *